United States Patent
Bian et al.

(10) Patent No.: US 9,852,749 B2
(45) Date of Patent: Dec. 26, 2017

(54) NEAR FIELD TRANSDUCER HAVING AN ADHESION LAYER COUPLED THERETO

(71) Applicant: Western Digital Technologies, Inc., Irvine, CA (US)

(72) Inventors: Xiaoping Bian, Saratoga, CA (US); Qing Dai, San Jose, CA (US); Alan C. Lam, San Jose, CA (US); Barry C. Stipe, San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/459,955

(22) Filed: Mar. 15, 2017

(65) Prior Publication Data

US 2017/0186451 A1 Jun. 29, 2017

Related U.S. Application Data

(63) Continuation of application No. 14/741,390, filed on Jun. 16, 2015, now Pat. No. 9,633,677.

(51) Int. Cl.
| | |
|---|---|
| *G11B 11/00* | (2006.01) |
| *G11B 5/31* | (2006.01) |
| *G11B 5/40* | (2006.01) |
| *G11B 5/00* | (2006.01) |
| *G11B 11/105* | (2006.01) |
| *G11B 5/60* | (2006.01) |

(52) U.S. Cl.
CPC ............ *G11B 5/314* (2013.01); *G11B 5/3163* (2013.01); *G11B 5/40* (2013.01); *G11B 5/6088* (2013.01); *G11B 11/1051* (2013.01); *G11B 11/10506* (2013.01); *G11B 11/10534* (2013.01); *G11B 11/10543* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,518,815 | B2 * | 4/2009 | Rottmayer | B82Y 10/00 360/59 |
| 8,339,740 | B2 | 12/2012 | Zou et al. | |
| 8,351,151 | B2 | 1/2013 | Katine et al. | |
| 8,351,305 | B2 | 1/2013 | Zhou et al. | |
| 8,811,127 | B1 * | 8/2014 | Hirata | G11B 5/3133 369/13.13 |
| 8,902,720 | B1 * | 12/2014 | Schreck | G11B 5/3106 369/112.27 |
| 8,988,827 | B1 * | 3/2015 | Balamane | G11B 5/314 360/125.31 |

(Continued)

OTHER PUBLICATIONS

Non-Final Office Action issued on U.S. Appl. No. 14/741,390, dated Mar. 28, 2016.

(Continued)

*Primary Examiner* — Tan X Dinh
(74) *Attorney, Agent, or Firm* — Foley & Lardner LLP

(57) ABSTRACT

An apparatus, according to one embodiment, comprises a near field transducer; an adhesion layer on a media facing side of the near field transducer, the adhesion layer comprising Ni and Cr; and a protective layer on a media facing side of the adhesion layer. Other apparatuses, systems and methods are described in additional embodiments.

20 Claims, 10 Drawing Sheets

(56) References Cited

U.S. PATENT DOCUMENTS

| | | | |
|---|---|---|---|
| 9,036,307 B1* | 5/2015 | Hoshiya | G11B 5/3903 |
| | | | 360/313 |
| 9,042,208 B1* | 5/2015 | Knigge | G11B 21/21 |
| | | | 360/75 |
| 9,165,569 B1* | 10/2015 | Kobayashi | G11B 5/235 |
| 2014/0004384 A1 | 1/2014 | Zhao et al. | |
| 2014/0177405 A1 | 6/2014 | Rejda et al. | |
| 2014/0313872 A1 | 10/2014 | Rawat et al. | |
| 2014/0376349 A1* | 12/2014 | Cheng | G11B 5/6088 |
| | | | 369/13.33 |
| 2014/0376350 A1* | 12/2014 | Cheng | G11B 5/4866 |
| | | | 369/13.33 |
| 2015/0117170 A1* | 4/2015 | Zhao | G11B 5/314 |
| | | | 369/13.33 |
| 2015/0170684 A1 | 6/2015 | Cheng et al. | |
| 2016/0372140 A1* | 12/2016 | Bian | G11B 5/314 |

OTHER PUBLICATIONS

Zhou et al., "Plasmonic near-field transducer for heat-assisted magnetic recording," Nanophotonics, vol. 3, Issue 3, Jun. 2014, pp. 141-155.

\* cited by examiner

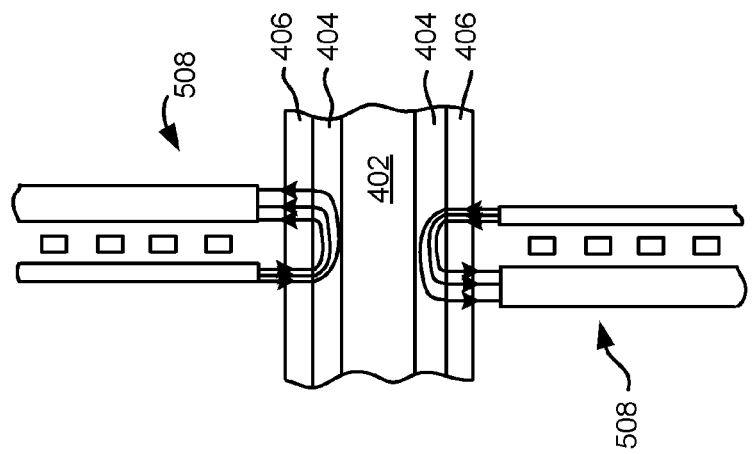
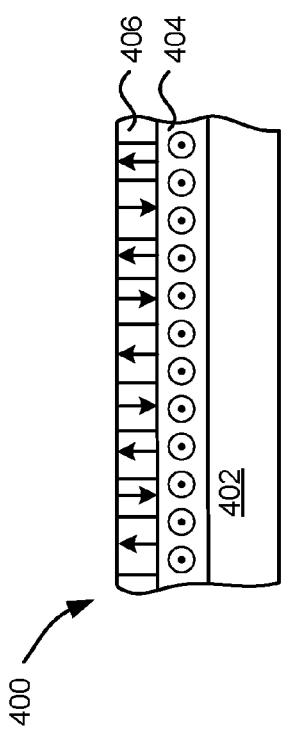
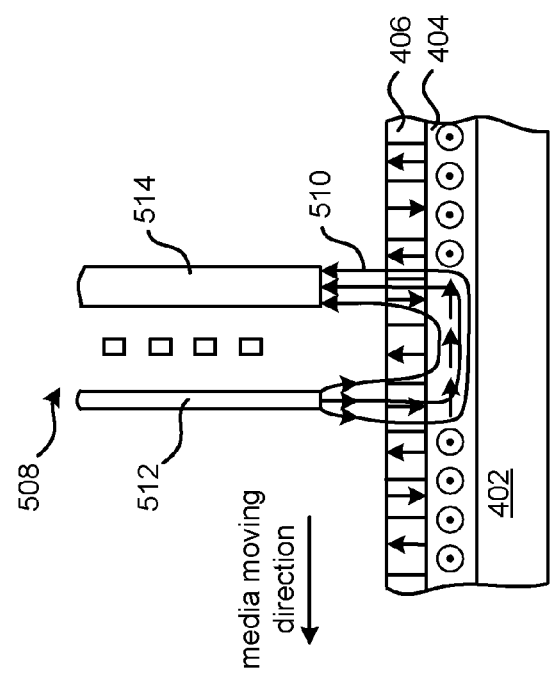

900

| Bake at 300°C | | 4Å NiCr + 2nm SiN | 2nm SiN ONLY |
|---|---|---|---|
| 60 min | Slightly Rounded | 0/5 | 4/4 |
| 110 min | Severely Damaged | 0/11 | 2/11 |
| | Slightly Rounded | 2/11 | 9/11 |
| | Intact | 9/11 | 0/11 |
| 160 min | Severely Damaged | 5/18 | 16/16 |
| | Slightly Rounded | 3/18 | 0/16 |
| | Intact | 10/18 | 0/16 |

NEAR FIELD TRANSDUCER HAVING AN ADHESION LAYER COUPLED THERETO

FIELD OF THE INVENTION

The present invention relates to data storage systems, and more particularly, this invention relates to heat assisted magnetic recording (HAMR) write heads having improved near field transducer (NFT) structure and methods for making the same.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this meet this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The ongoing quest for higher storage bit densities in magnetic media used in disk drives has reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media and/or lowering the temperature. However, lowering the temperature is not a practical option when designing hard disk drives for commercial and consumer use. Alternatively, raising the coercivity is a practical solution, but requires write heads employing higher magnetic moment materials which will make data recording more challenging.

One solution has been proposed, which employs heat to lower the effective coercivity of a localized region on the magnetic media surface and writes data within this heated region. The data state becomes "fixed" upon cooling the media to ambient temperatures. This technique is broadly referred to interchangeably as HAMR, "heat assisted magnetic recording," or TAR or TAMR, "thermally assisted (magnetic) recording." HAMR can be applied to both longitudinal and perpendicular recording systems, although the highest density state of the art storage systems are more likely to be perpendicular recording systems. Heating of the media surface has been accomplished by a number of techniques such as focused laser beams or near field optical sources.

SUMMARY

An apparatus, according to one embodiment, includes a near field transducer; an adhesion layer on a media facing side of the near field transducer, the adhesion layer comprising Ni and Cr; and a protective layer on a media facing side of the adhesion layer.

An apparatus, according to another embodiment, includes a near field transducer for heating a magnetic medium; a light source for illuminating the near field transducer; a write pole adjacent the near field transducer; an adhesion layer on a media facing side of the near field transducer, the adhesion layer comprising Ni and Cr; and a protective layer on a media facing side of the adhesion layer.

A method, according to yet another embodiment, includes forming an adhesion layer on a media facing side of a near field transducer, the adhesion layer comprising Ni and Cr; and forming a protective layer on a media facing side of the adhesion layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein implement a magnetic recording head having an NFT and an adhesion layer coupled thereto. Accordingly, approaches herein may include HAMR write heads having improved NFT structures and functionality thereof.

In one general embodiment, a system includes a near field transducer; an adhesion layer on a media facing side of the near field transducer, the adhesion layer comprising Ni and Cr; and a protective layer on a media facing side of the adhesion layer.

In another general embodiment, a system includes a near field transducer for heating a magnetic medium; a light source for illuminating the near field transducer; a write pole adjacent the near field transducer; an adhesion layer on a media facing side of the near field transducer, the adhesion layer comprising Ni and Cr; and a protective layer on a media facing side of the adhesion layer.

In yet another general embodiment, a method includes forming an adhesion layer on a media facing side of a near field transducer, the adhesion layer comprising Ni and Cr; and forming a protective layer on a media facing side of the adhesion layer.

Figure 1:
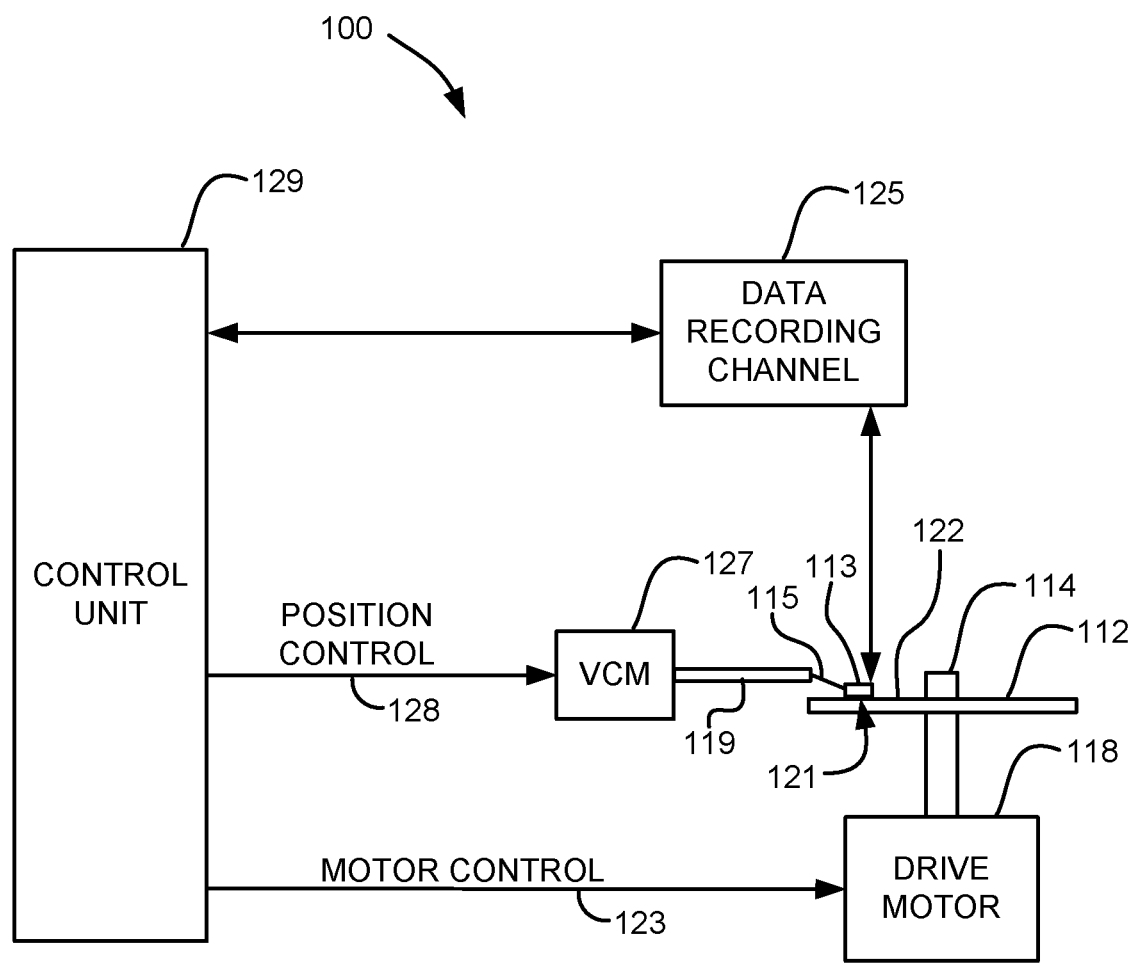
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare)

to form the yoke. The placement of the flare point directly affects the magnitude of the magnetic field produced to write information on the recording medium.

Figure 2A:
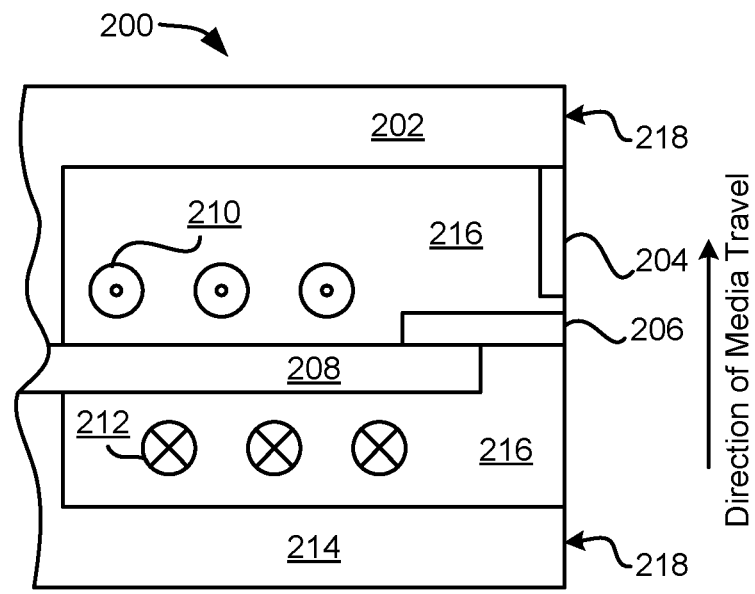
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
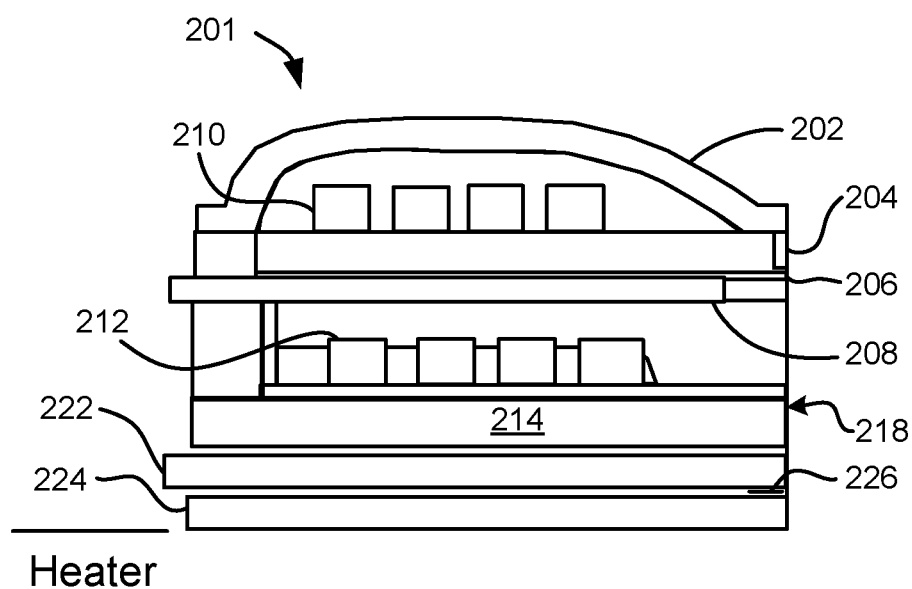
FIG. 2B is a cross-sectional view a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
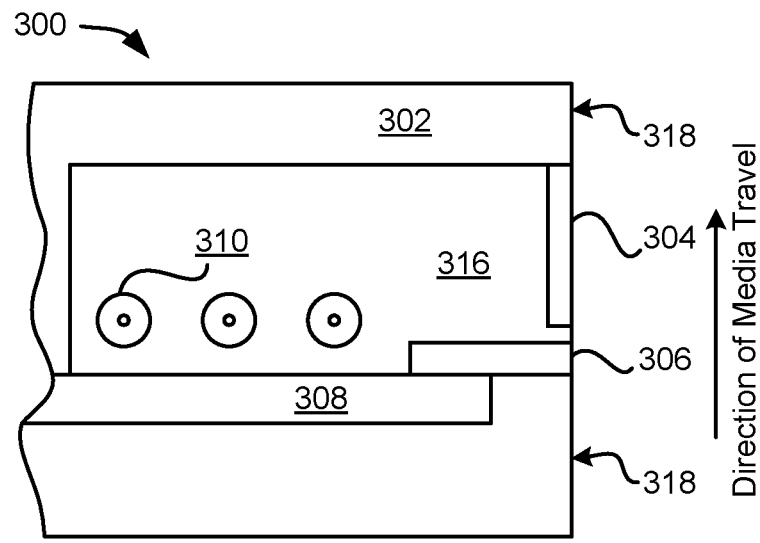
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
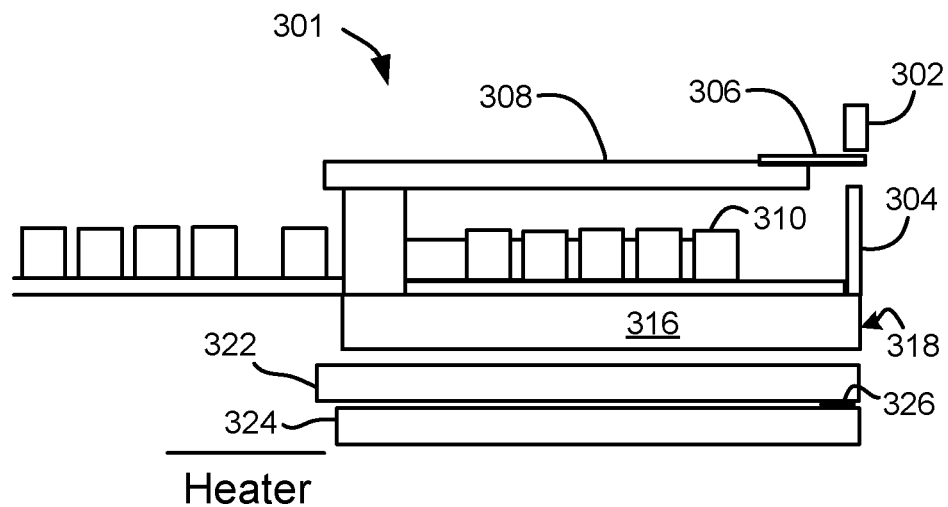
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

Figure 6:
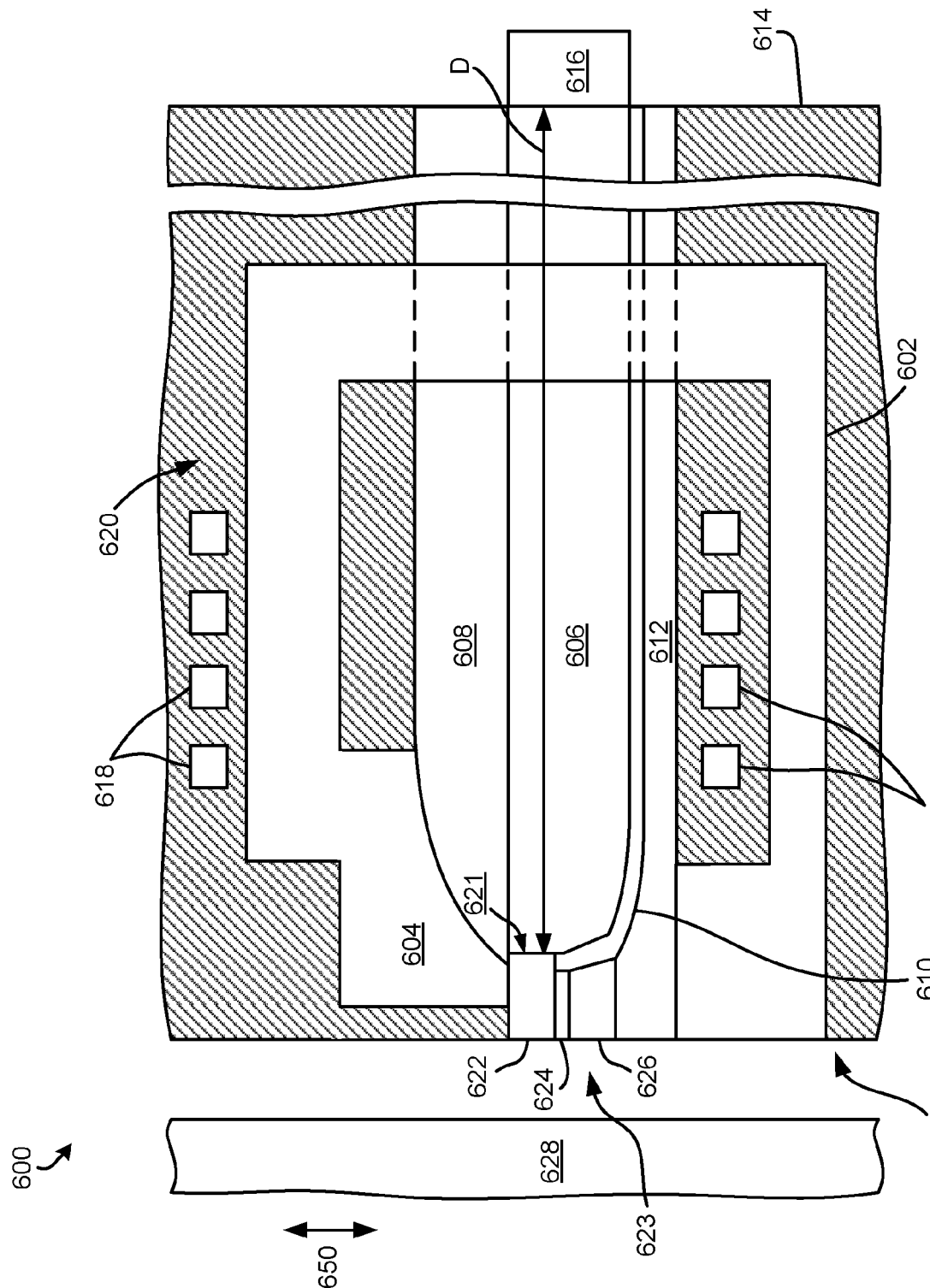
FIG. 6 is a partial cross sectional view of a thin film perpendicular write head according to one embodiment.

As previously mentioned, HAMR, or equivalently TAR, is a method of recording information onto a magnetic recording medium, such as a disk, tape, etc. FIG. 6 depicts a partial cross sectional view of an illustrative magnetic HAMR head 600, in accordance with one embodiment. Of course, the exemplary head shown in FIG. 6 is presented by way of example only, and any conventional or new head construction may be used in conjunction with various embodiments. As an option, the present head 600 may be implemented in conjunction with features from any other embodiment listed herein, such as those described with reference to the other FIGS. Of course, however, such head 600 and others presented herein may be used in various applications and/or in permutations which may or may not be specifically described in the illustrative embodiments listed herein. Further, the head 600 presented herein may be used in any desired environment.

It should be noted that the dimensions of the components illustrated in FIG. 6 may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIG. 6 illustrates an illustrative cross sectional view of a magnetic HAMR head 600, additional and/or alternative layers and combinations of layers may be used in the structure as would be appreciated by one of ordinary skill in the relevant art upon reading the present disclosure, including insulating layers, adhesion layers, etc. In addition, any of the layers described in relation to head 600 may be comprised of multiple layers, which may or may not be of the same material.

Referring now to FIG. 6, the head 600 includes a return pole 602 which is coupled to the main pole 604, a portion of the main pole 604 being positioned towards the media facing side (ABS). The poles 602, 604 may include a conventional magnetic alloy or material. Exemplary materials for the poles 602, 604 include Co, Ni, Fe, Cr etc. and/or combinations thereof such as NiFe, CoFe, CoNiFe, CoFeCr etc.

The head 600 also includes an optical waveguide 606, surrounded by cladding layers 608, 610, 612. According to the present embodiment, the cladding layers 608, 610, 612 are illustrated as extending to at least the flex side 614; although in other embodiments, some or all of the cladding layers may not extend to the flex side 614.

Moreover, one of the cladding layers 610 forms a recess between the waveguide 606 and the NFT 623. Further, cladding layer 610 is also directly adjacent a side of the waveguide 606, e.g., extending parallel to a longitudinal axis of the waveguide 606 along its stripe height. Additionally, another one of the cladding layers 612 extends along a leading edge side of the NFT 623, thereby forming a portion of the media facing side. Thus, in some embodiments, the waveguide 606 may be positioned adjacent two cladding layers 610, 612, e.g., as illustrated in FIG. 6.

In various embodiments, the cladding layers 608, 610, 612 may include any material as would be known to one of ordinary skill in the relevant art, such as $Al_2O_3$, $SiO_2$, etc., and/or their composites. Moreover, the cladding layers 608, 610, 612 may include same, similar or different materials, depending on the desired embodiment.

The waveguide 606 extends to the flex side 614 having a near field optical source 616, e.g., a laser. However, in other approaches, the optical waveguide 606 may be spaced from the NFT 623 by between about 100 nm and about 10 nm, but may be higher or lower depending on the desired embodiment.

The optical source 616 emits an optical signal, e.g., light, that is desirably directed along the optical waveguide 606, towards the NFT 623. Thus the waveguide 606 is generally used to deliver light energy to the NFT 623 which may be used to heat a magnetic medium, e.g., by creating a small hot-spot on the surface of the magnetic medium 628, thereby inducing isolated heating of the magnetic medium 628 (e.g., disk) surface as it travels in the intended direction of media travel 650. The waveguide 606 preferably includes a material having a high refractive index (e.g., at least higher than the cladding layers 608, 610, 612), thereby assisting in keeping the optical signal, emitted from the optical source 616, within the waveguide 606. Illustrative materials for the waveguide 606 include, but are not limited to, $TaO_x$, $TiO_x$, $NbO_x$, $ZrO_x$, $HfO_x$, etc., and/or their composites. Other exemplary materials for the waveguide 606 may include $Ta_2O_5$, and/or $TiO_2$.

The cladding layers 608, 610, 612 preferably include a material having a low refractive index, e.g., so as to keep the optical signal confined within the sidewalls of the waveguide. In general, a low refractive index material may include any material having refractive index below about 1.75, but could be higher or lower depending on the desired embodiment. In other approaches, the low refractive index may be lower than the refractive index of the waveguide 606. Illustrative materials for the cladding layers 608, 610, 612 include refractive oxides such as $AlO_x$, $SiO_x$, etc. or other conventional materials having a desirably low refractive index.

As shown, the waveguide 606 may have an approximately uniform cross section along its length. The thickness of the waveguide 606 may be nominally between about 200 nm and about 400 nm, but is preferably thicker than the aperture 624.

However, as well known in the art, the waveguide 606 and/or cladding layers may have a number of other possible designs including a planar solid immersion mirror or planar solid immersion lens which have a non-uniform core cross section along the waveguide's length. Thus, according to various approaches, the waveguide 606 may have any other cross sectional profile as selected by one of ordinary skill in the relevant art, such as a rectangular, square, triangular, circular, etc., cross section.

With continued reference to FIG. 6, the head 600 also includes write coils 618 positioned in a conventional insulation layer 620, e.g., alumina. As would be appreciated by one skilled in the art, the write coils may assist the head 600 perform write operations by inducing a magnetic field in the return pole 602 which is transferred to the main pole 604 and concentrated in a magnetic lip 622 which is used to write to a magnetic medium 628 (e.g., a magnetic disk) spaced therefrom. In other words, the magnetic lip 622 may serve as a write pole. Thus, the magnetic lip 622 is preferably magnetically coupled to the main pole 604, and the return pole 602. In other embodiments, the main pole 604 may have a step formed near the lower portion of the main pole 604. It is also preferred that the magnetic lip 622 has a straight and substantially vertical (perpendicular to the plane of deposition) back edge 621, e.g., farthest from the media facing surface of the head 600.

Additionally, the NFT 623 is illustrated as including an aperture 624 (e.g., a C aperture) and a conductive metal film main body 626 therebelow which may be used to assist in performing write operations. The NFT 623 may be used to heat the magnetic medium, thereby softening the magnetic stability of the magnetic grains thereof. The energy to heat the magnetic medium may be supplied to the NFT 623 from the optical source 616 via the waveguide 606. In preferred embodiments, this allows for the magnetic field concentrated at the magnetic lip 622 to influence the magnetic orientation of the magnetic grains on the medium 628, e.g., to perform a write operation. Therefore, it is desirable that the NFT 623 is located adjacent the magnetic lip 622, e.g., as illustrated in FIG. 6.

According to one approach, the conductive metal film main body 626 may have a circular cross sectional shape with a notch extending therefrom, e.g., as would be appreciated by one skilled in the art as a "lollipop antenna."

However, depending on the desired embodiment, the conductive metal film main body 626 may have any shape, e.g., an E-shaped.

Furthermore, it may be beneficial to confine heat to about a single data track which may be approximately 40 nm wide or smaller. Candidate near-field optical sources typically use a low-loss plasmonic metal (Au, Ag, Al, Cu, etc.) shaped in such a way as to concentrate surface charge motion at a tip apex located at the slider media facing side when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the notch slot waveguide from microwave circuits applied to optical frequencies (also known as the C aperture). Light polarization may be aligned with the notch and incident light may concentrate surface charge at the tip of the notch.

According to one embodiment, the magnetic lip 622 may have a nominal length (as measured from the media facing side in the stripe height direction) approximately equal to that of the main body 626, but the lengths may be different, e.g., as determined by the performance and/or properties of the near field optical source, NFT and/or magnetic lip. Moreover, according to various other embodiments, the length of the magnetic lip 622 may vary from about 50 nm to about 500 nm, more preferably between about 50 nm and about 200 nm, but may be higher or lower depending on the desired embodiment.

Figure 7A:
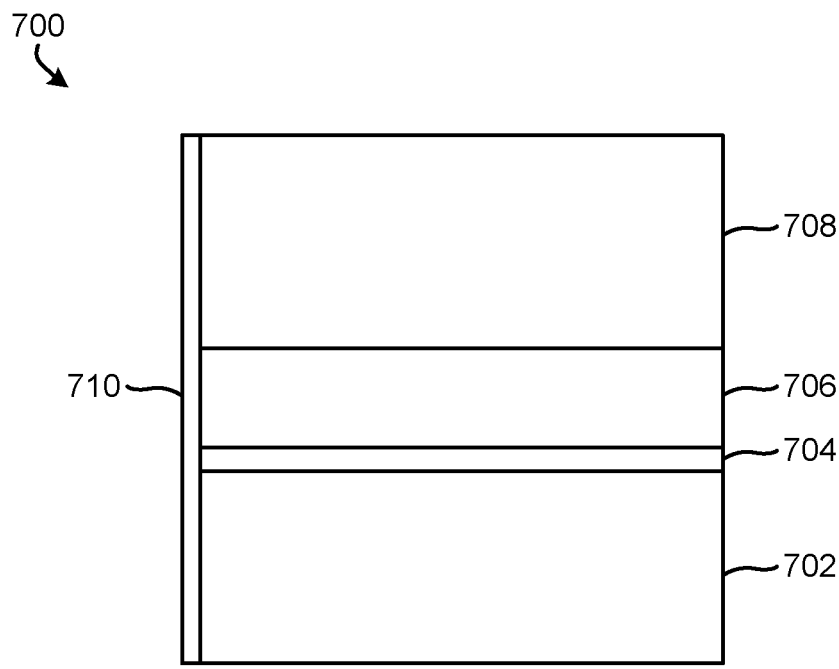
FIG. 7A-7B are partial side views of a HAMR head having an NFT, according to one embodiment.

However, while developing HAMR heads such as the one illustrated in the exemplary embodiment of FIG. 6, the inventors discovered that an undesirable effect as a result of heating the NFT, as will soon become apparent. Looking to FIG. 7A, a detailed view of a partial HAMR head 700 having an NFT 702 is illustrated. As shown, an adhesion layer 704 is formed above the NFT 702 and an aperture 706 is formed above the adhesion layer 704. Moreover, main pole magnetic lip 708 is formed above the aperture 706. It should be noted that the term "above" is in no way intended to limit the invention, but rather is included to describe the orientation of the layers 702, 704, 706, 708 with respect to each other. Thus, regardless of which layer is considered as being "above" another layer, the adhesion layer 704 and aperture 706 are sandwiched between the NFT 702 and the magnetic lip 708 according to the present embodiment.

Referring still to head 700, a protective layer 710 is formed over the media facing side of the layers 702, 704, 706, 708. The protective layer 710 is intended to serve as a protective overcoat layer for the underlying layers 702, 704, 706, 708, e.g., to prevent corrosion, exposure to contaminants, wear, etc. The NFT 702 preferably includes gold which is a low-loss metal as mentioned above. Moreover, the protective layer 710 was formed using $SiN_xO_y$ in the beginning stages of the inventor's HAMR head development process.

However, as mentioned above, during development the inventors discovered that when the NFT 702 was exposed to the high operating temperatures experienced during HAMR, the NFT 702 undesirably separated from the $SiN_xO_y$ protective layer 710 to form voids. Looking to FIG. 7B, a HAMR head 750 having been exposed to HAMR operating temperatures is depicted as having voids 712 where the NFT material has retreated as a result of being exposed to the high operating temperatures, and densified. Gold, especially pure gold, has a relatively low melting temperature, is malleable and tends to densify at high temperatures. The extent of damage to the NFT depends, at least in part, on the extent of use. The gold begins by pulling away from the interface with the $SiN_xO_y$ protective layer 710, and as the damage continues to progress, the resulting voids continue to expand away from the media facing side thereof.

However, gold is also an inert material, which desirably tends to not interfere with crystalline type $SiN_xO_y$ protective layer 710 material, thereby making gold a desirable NFT material. Accordingly, in an attempt to counteract the undesirable performance issues experienced by the NFT structure during operation, the inventors, though trial and error, discovered a unique adhesion layer for the gold surface, which surprisingly and unpredictably was found to reduce the formation of voids in the NFT gold layer.

The adhesion layer described herein may be applied to the media facing side of any head having an NFT. Solely by way of example, and to place the invention in an illustrative context to assist the reader, an exemplary embodiment is presented in FIGS. 8A-8C. Again, it should be kept in mind that the adhesion layer and any overlying layer may be added to the media facing side of any type of head having an NFT.

Figure 8A:
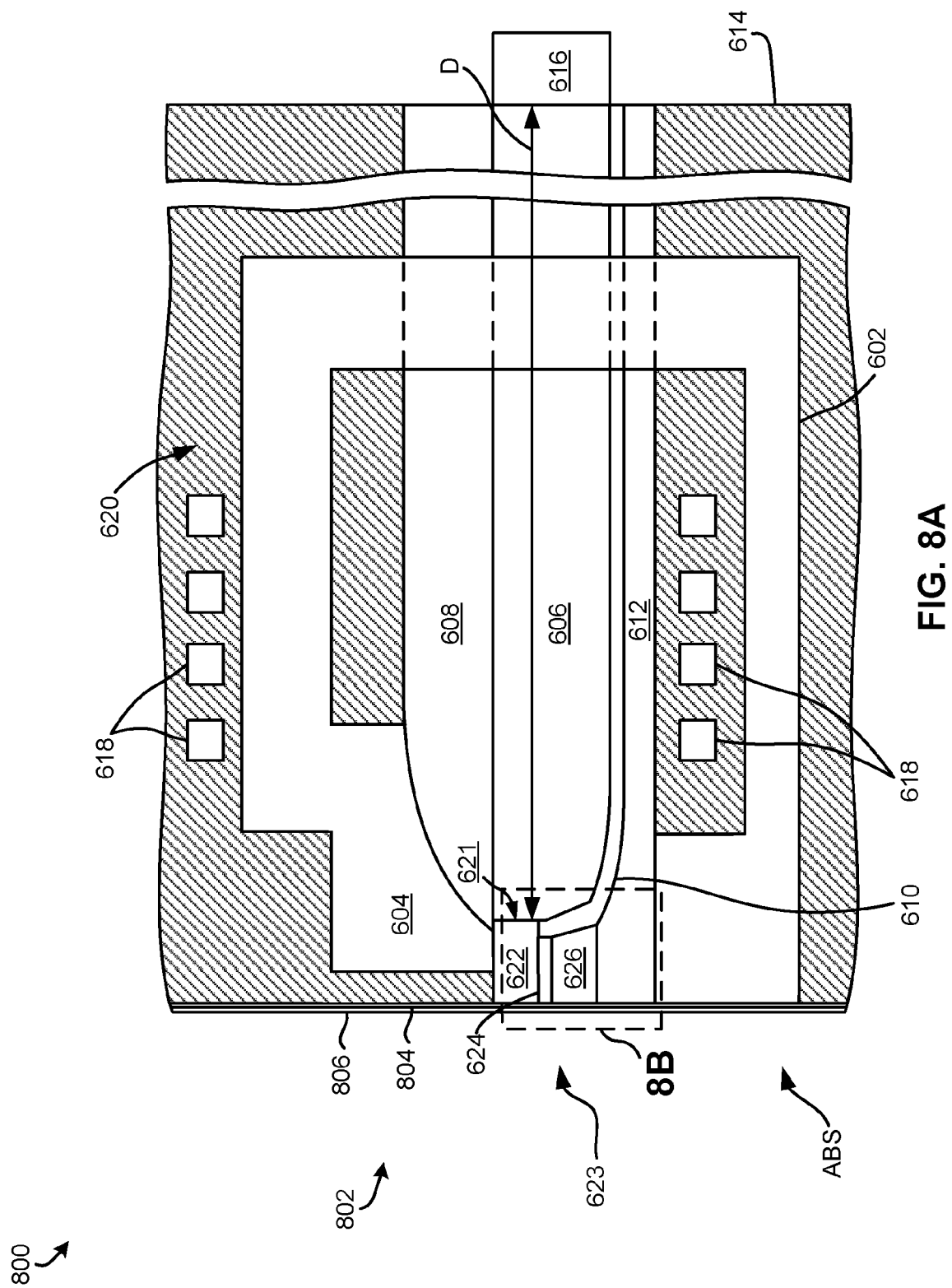
FIG. 8A is a partial side view of a HAMR head having an NFT, according to one embodiment.
Figure 8B:
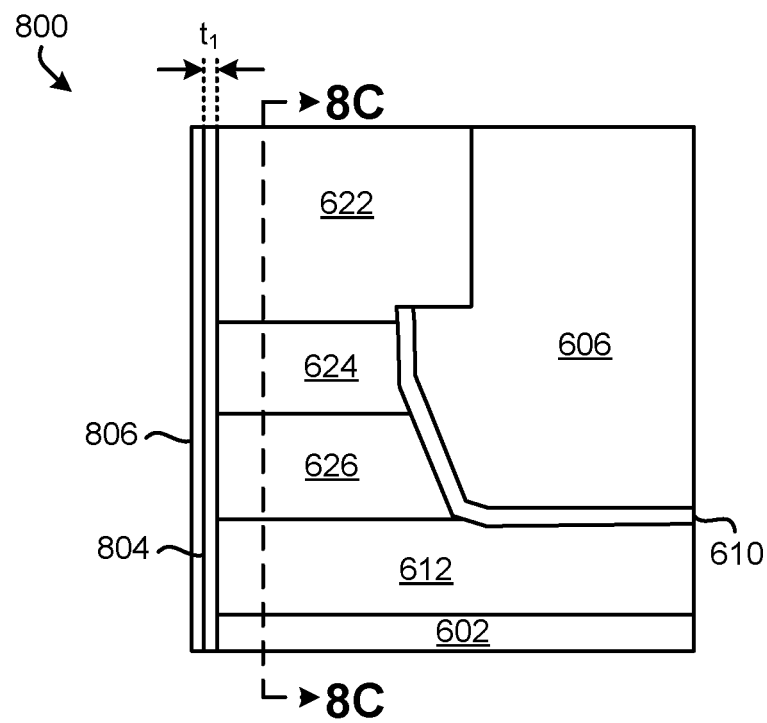
FIG. 8B is a detailed side view of the head of FIG. 8A, taken along box 8B.
Figure 8C:
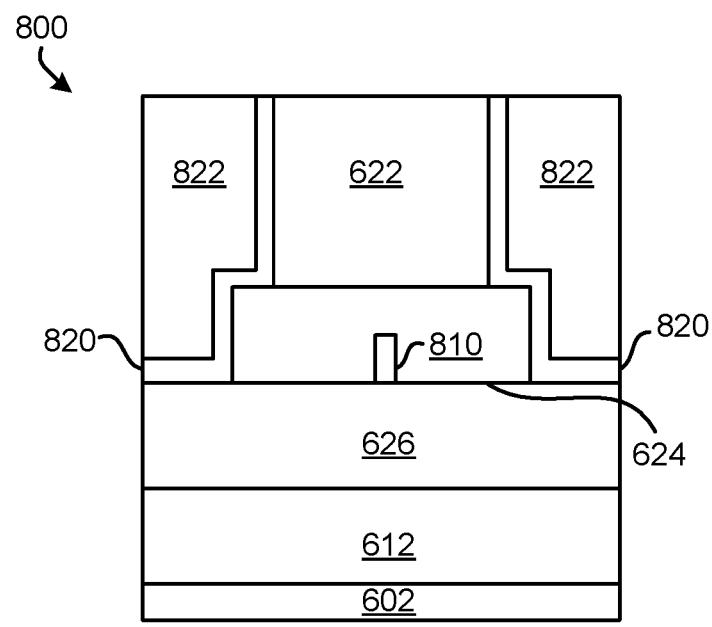
FIG. 8C is a throat view of the head of FIG. 8B, taken along line 8C-8C.

Looking to FIGS. 8A-8C, a system 800 is shown in accordance with one embodiment. As an option, the present system 800 may be implemented in conjunction with features from any other embodiment listed herein, such as those described with reference to the other FIGS., such as FIG. 6. Specifically, FIGS. 8A-8C illustrate variations of the embodiment of FIG. 6. Accordingly, various components of FIGS. 8A-8C have common numbering with those of FIG. 6.

However, such system 800 and others presented herein may be used in various applications and/or in permutations which may or may not be specifically described in the illustrative embodiments listed herein. Further, the system 800 presented herein may be used in any desired environment. Thus FIGS. 8A-8C (and the other FIGS.) may be deemed to include any possible permutation.

FIGS. 8A-8B illustrate system 800 as including a HAMR head 802 having an NFT 623 (e.g., preferably including gold), an optical source 616 for illuminating the NFT 623, and a waveguide 606 which is generally used to deliver light energy to the NFT 623, e.g., with the help of cladding layers 608, 610, 612 as described above. Moreover, the NFT 623 preferably includes a notch extending from a main body 626 thereof, e.g., as described above and as shown in the throat view of head 802 in FIG. 8C.

Referring momentarily to the throat view of FIG. 8C, the notch 810 is shown according to an exemplary embodiment, which is in no way intended to limit the invention. Moreover, the wraparound layer 820 and the heat sink 822 preferably include one or more materials with high thermal conductivity such as Au, Ag, Cu, Ta, Ti, Cr, etc., or any other desirable materials as would be appreciated by one skilled in the art upon reading the present description. As described above, the notch 810 focuses the heat produced by the light source in conjunction with the waveguide and NFT, preferably such that the heat may be concentrated to about an individual track level. However, NFT structures in conventional implementations, particularly the notches, were found to degrade and become damaged with use, eventually rendering the corresponding head inoperable as a whole as will be described in further detail below with reference to FIG. 9. However, aspects of the present invention reduce the occurrence of such damage.

Referring again to FIGS. 8A-8B the head 802 additionally includes write coils 618, main pole 604 (a write pole) adjacent the NFT 623, the main pole 604 being coupled to return pole 602. Adhesion layer 804 and protective layer 806 are also included on the media facing side of the HAMR head 802, including a media facing side of the NFT 623 structure. While the protective layer 806 may include $SiN_xO_y$, the adhesion layer 804 preferably includes Ni and Cr, as will soon become apparent.

Figure 7B:
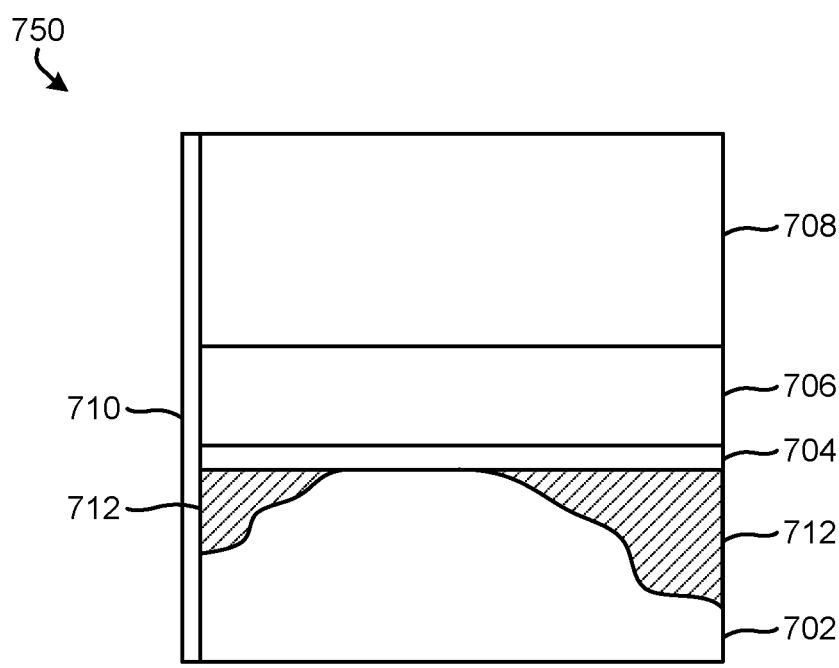

As mentioned above, $SiN_xO_y$ serves as a desirable material for the protective layer 806 as $SiN_xO_y$ is an optically transparent material. Moreover, the NFT 623 preferably includes low-loss metals such as gold. However, gold has a tendency to densify and separate from the protective layer 806 during use of the NFT (e.g., HAMR writing), thereby forming voids as seen in FIG. 7B. In sharp contrast, by adding an adhesion layer 804 comprising Ni and Cr between the protective layer 806 and the NFT 623, the inventors surprisingly found that the NFT 623 remained pinned to the protective layer 806 even during prolonged use, e.g., see FIG. 9 below. This result was unpredictable, and only discovered by trial and error.

Although the inventors are uncertain as to how the addition of an adhesion layer having Ni and Cr has such a significant effect on the structural integrity and performance of the NFT, the materials and/or process used to form the adhesion layer may play an important role. Without wishing to be bound by any theory, and now armed with the discovery that the adhesion layer provides a beneficial effect, the inventors believe that the combination of Ni and Cr are able to improve the pinning of the NFT to the protective layer. Again, without wishing to be bound by any theory, it is believed that the Ni couples well with gold found in the NFT structure. The amount of Ni which couples with (e.g., mixes with) the gold may be within a few percent of the total amount of gold in the NFT. Furthermore, the Cr may become at least partially nitrided during the process of forming the adhesion layer, thereby allowing the adhesion layer to couple with the protective layer. Specifically, the nitrided Cr of the adhesion layer is believed to couple well with the Nitrogen of the $SiN_xO_y$ protective layer. Thus, although a NiCr adhesion layer by itself is an alloy, unpredictable improvements were achieved as a result of applying the NiCr adhesion layer to the media facing surface of an NFT.

Figures 9, 10:
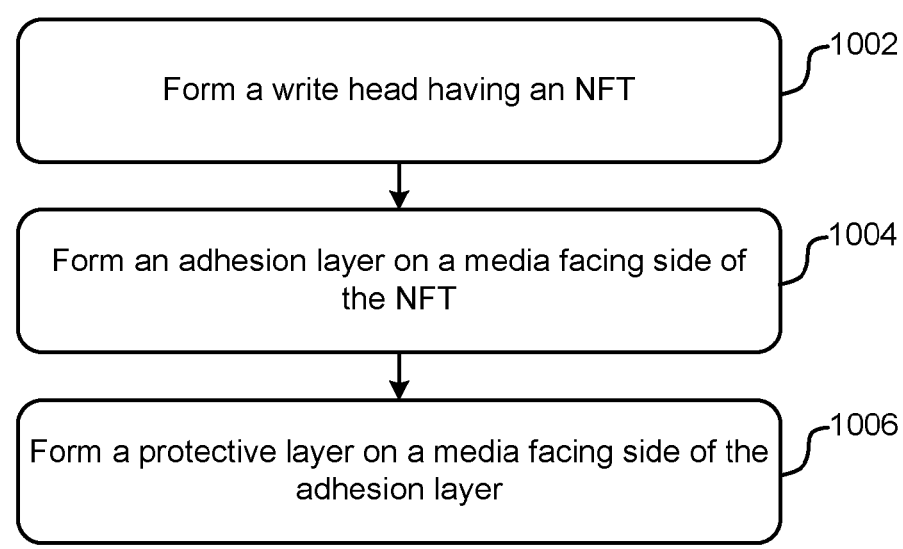
FIG. 9 is a table of experimental data, according to one embodiment.
FIG. 10 is a flowchart of a method, according to one embodiment.

FIG. 9 shows a table 900 of results achieved by exposing a plurality of NFT structures, having one of two different configurations, to simulated writing environment temperatures by baking the NFT structures at about 300 degrees Centigrade (300° C.), which simulates a temperature range experienced at the NFT while writing. One of the configurations for the tested NFT structures included a NiCr adhesion layer having a thickness of about 4 Å formed on the media facing side of the NFT, and an about 2 nm $SiN_xO_y$ protective layer formed on the media facing side of the adhesion layer according to some of the embodiments described herein. Alternatively, the second NFT structure configuration implemented conventional design, having only a $SiN_xO_y$ protective layer formed on the media facing side of the NFT.

As seen in table 900, all of the four NFT structures having conventional design (only a $SiN_xO_y$ protective layer formed on the media facing side of the NFT) had rounded notches even after 60 minutes of exposure to the 300° C. baking environment. Thus, none of the notches associated with the conventional NFT structures remained intact after only 60 minutes of exposure. In sharp contrast, none of the five alternate NFT structures configuration having both an adhesion layer and a protective layer had a rounded notch after 60 minutes of exposure to the 300° C. baking environment. Thus, the notches of all NFT structures having both an adhesion layer and a protective layer were intact after 60 minutes of exposure.

The extent of damage to an NFT depends, at least in part, on the extent of use. Accordingly, advancing to 110 minutes of exposure to the 300° C. baking environment, two of the eleven notches associated with the conventional NFT structures were found to be severely damaged, while the remaining nine of the eleven notches associated with the conventional NFT structures were found to be rounded. In comparison, none of the notches were severely damaged for the eleven NFT structures having both an adhesion layer and a protective layer, and only two of the eleven notches were found to be rounded.

Proceeding with the experiment again, this time to 160 minutes of exposure to the 300° C. baking environment, all notches associated with the conventional NFT structures were found to be severely damaged. In sharp contrast, over half of the notches of the NFT structures having both an adhesion layer and a protective layer were found to be still intact. Accordingly, the inventors unpredictably discovered that adding an adhesion layer having Ni and Cr to the media facing surface of an NFT extended the operable life of the NFT to surpass even extensive use.

It follows that, the surprising and significant improvements achieved by the embodiments disclosed herein become apparent very quickly at a simulated writing temperature. While irreversible damage is experienced almost immediately for the conventional NFT structures, the inventors unpredictably discovered that by adding an adhesion layer comprising Ni and Cr between the NFT and the protective layer, significant improvements to structural integrity and performance are achieved.

Referring again to FIGS. 8A-8B, as mentioned above, the adhesion layer 804 preferably includes Ni and Cr. According to different approaches, the amount of Ni to Cr in the adhesion layer 804 may be in a range from about 25% Ni and about 75% Cr to about 75% Ni and about 25% Cr on an atomic percentage basis, e.g., depending on the desired embodiment. According to other approaches, an amount of Ni to Cr in the adhesion layer 804 may be in the range of greater than 0% Ni and less than 100% Cr to about 67% Ni and about 33% Cr on an atomic percentage basis. Moreover, a deposition thickness $t_1$ of the adhesion layer 804 (seen in FIG. 8B) may be from about 2 Å to about 16 Å, more preferably from about 2 Å to about 6 Å, but could be higher or lower depending on the desired embodiment.

As mentioned above, the inventors believe that at least one component of the adhesion layer 804 is nitrided as a byproduct of formation. According to embodiments having Ni and Cr in the adhesion layer 804, the Cr may be nitrided during the formation of the adhesion layer. According to an illustrative approach, the Cr may be nitrided to produce a 2Cr:3N ratio.

Now referring to FIG. 10, a flowchart of a method 1000 is shown according to one embodiment. Conventional fabrication processes may be used. The method 1000 may be performed in accordance with the present invention in any of the environments depicted in FIGS. 1-8C, among others, in various embodiments. Of course, more or less operations than those specifically described in FIG. 10 may be included in method 1000, as would be understood by one of skill in the art upon reading the present descriptions.

As shown in FIG. 10, method 1000 includes operation 1002, where a HAMR write head having an NFT is formed, e.g., using any one or more processes that would become apparent to one skilled in the art upon reading the present description. Moreover, operation 1004 includes forming an adhesion layer on a media facing side of the near field transducer. Furthermore, operation 1006 includes forming a protective layer on a media facing side of the adhesion layer.

As described above, the adhesion layer preferably includes Ni and Cr. Thus, forming the adhesion layer may include applying Ni and Cr to the media facing side of the write head. According to an exemplary embodiment, which is in no way intended to limit the invention, the Ni and Cr may be applied to the media facing side of the write head using vacuum deposition (e.g., sputtering). Moreover, it may be preferred that the Ni and Cr are applied to the media facing surface of the write head in an inert environment, as would be appreciated by one skilled in the art upon reading the present description. Referring still to the exemplary embodiment, Nitrogen Argon plasma may subsequently be introduced to the deposition environment, whereby Si and N may be sputtered onto the media facing side of the write head over the previously applied NiCr adhesion layer. By sputtering the Si and N in the Nitrogen Argon plasma infused deposition environment, a $SiN_xO_y$ protective layer is formed. The aforementioned nitrogenation is believed to occur as a result of introducing the Nitrogen Argon plasma in preparation for the $SiN_xO_y$ protective layer deposition.

The structure resulting from the implementation of method 1000 preferably includes the adhesion layer positioned on the media facing side of the NFT, and the protective layer positioned on the media facing side of the adhesion layer, e.g., as shown in FIGS. 8A-8B. However, it should be noted that although the adhesion layer 804 is illustrated in FIGS. 8A-8B as having been applied to a majority of the media facing side of the head 802, application of the adhesion layer 804 may be selectively limited to certain regions of the media facing surface in other embodiments.

Figure 11:
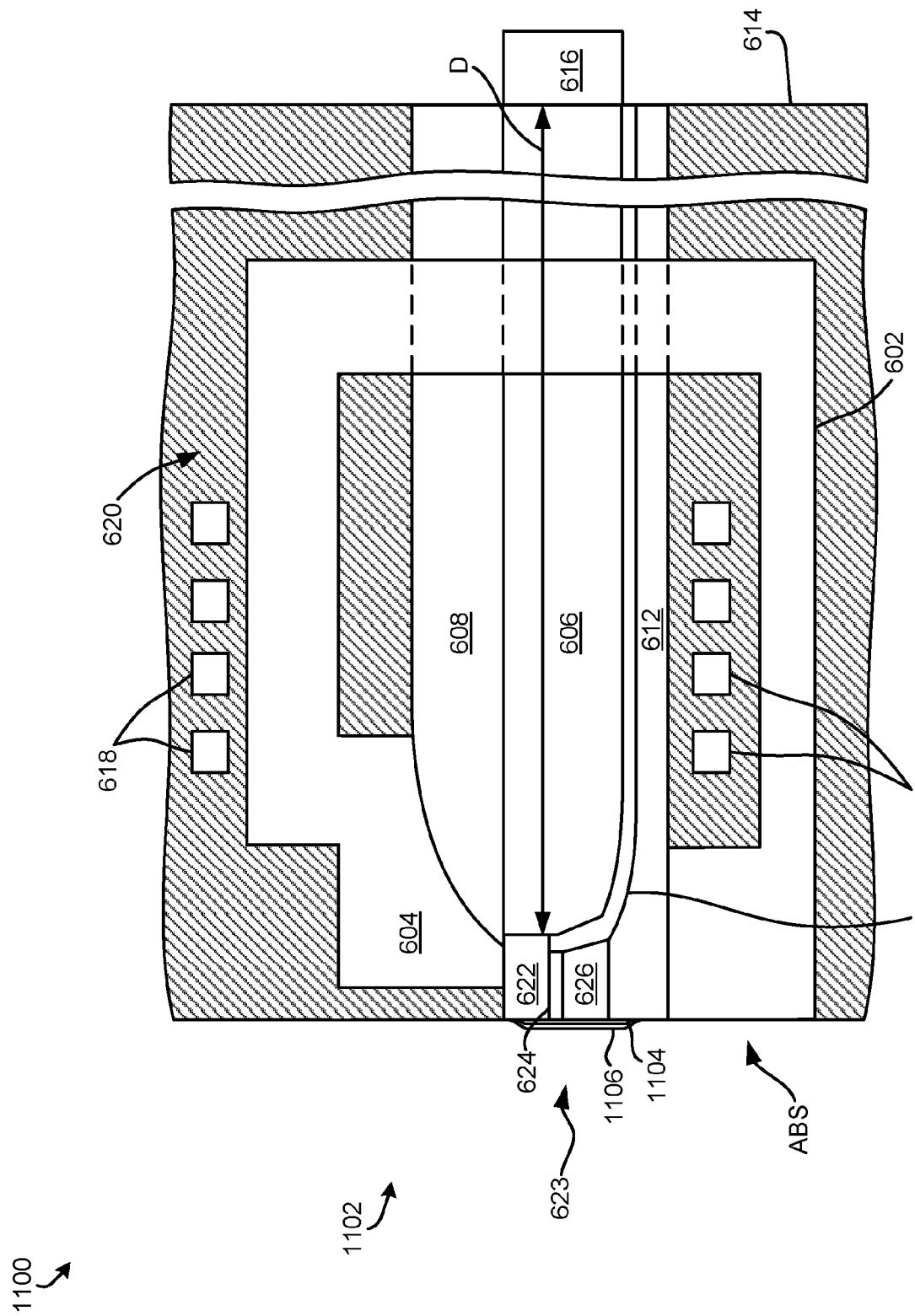
FIG. 11 is a partial side view of a HAMR head having an NFT, according to one embodiment.

For example, looking to FIG. 11, a system 1100 having a write head 1102 is shown in accordance with one embodiment. As an option, the present system 1100 may be implemented in conjunction with features from any other embodiment listed herein, such as those described with reference to the other FIGS., such as FIG. 6. Specifically, FIG. 11 illustrates variations of the embodiment of FIG. 6. Accordingly, various components of FIG. 11 has common numbering with those of FIG. 6.

However, such system 1100 and others presented herein may be used in various applications and/or in permutations which may or may not be specifically described in the illustrative embodiments listed herein. Further, the system 1100 presented herein may be used in any desired environment. Thus FIG. 11 (and the other FIGS.) may be deemed to include any possible permutation.

The write head 1102 of system 1100 is illustrated as including an adhesion layer 1104 which has a "windowed structure." In other words, the adhesion layer 1104 has been selectively applied to a portion of the media facing surface of the NFT 623 such that the adhesion layer 1104 is localized to the NFT region. The protective layer 1106 is also illustrated as having a windowed structure which is localized to the NFT region. Exemplary embodiments for implementing windowed structures are disclosed in U.S. Pat. No. 8,902, 720, which is hereby incorporated by reference. In an alternate embodiment, the adhesion layer may be applied to the entire media facing side of the head.

Thus, the adhesion layer and/or protective layer may be applied to the whole media facing side of the write head in some embodiments, while in other embodiments the adhesion layer and/or protective layer may only be applied to the NFT region of the media facing side as "window structures." Thus, the adhesion and/or protective layers may be localized to an NFT region of the media facing side of the write head. For embodiments in which the adhesion and protective layers implement windowed structures, a supplemental layer (not shown) may be applied to the media facing side of the write head, e.g., to protect the layers which would otherwise be exposed to wear at the media facing side.

In some embodiments, it may be desirable to restrict the adhesion layer and/or protective layer to the NFT region as a more localized application will reduce the sensitivity of the overall structure's performance with respect to the thickness of the layers. Thus, embodiments in which the adhesion and/or protective layers are localized to an NFT region of the media facing side of the write head may experience improved performance over embodiments which implement a non-localized adhesion layer and/or protective layer having the same deposition thickness as the localized adhesion layer and/or protective layer respectively.

Again, the unpredictable and significant improvements achieved by various embodiments disclosed herein overcome the irreversible damage experienced almost immediately for the conventional NFT structures during use (writing). The inventors unexpectedly discovered that by adding an adhesion layer between the NFT and the protective layer, significant improvements to structural integrity and performance are achieved. The inventors were unsure as to whether the addition of an adhesion layer in combination with the protective layer would have any effect on the overall structure as a whole. This uncertainty is particularly reflected in view of the difficulty associated with controlling the thickness of an applied adhesion layer in view of the fabrication processes involved.

As a result, various embodiments described herein may enable use of an optically transparent protective layer having $SiN_xO_y$ without negatively affecting performance. Moreover, the application of $SiN_xO_y$ protective layers prevent increased operational temperatures at the surface of the protective layer as well as desirably pinning a gold NFT and a $SiN_xO_y$ protective layer by introducing an adhesion layer. As a result, the effective lifetime of the NFT is increased. Said another way, the implementation of an adhesion layer as described and/or suggested herein may be used to couple the NFT to a protective overcoat, thereby preventing any voids from forming in the NFT structure during use, even after an extensive amount of time in use.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a near field transducer;
an adhesion layer on a media facing side of the near field transducer, the adhesion layer comprising Ni and Cr; and
a protective layer on the media facing side of the adhesion layer,
wherein the protective layer comprises Si, N, and O,
wherein the Cr of the adhesion layer is coupled to the N of the protective layer.

2. The apparatus as recited in claim 1, wherein the Cr in the adhesion layer is at least partially nitrided to produce a 2Cr:3N ratio.

3. The apparatus as recited in claim 1, wherein a deposition thickness of the adhesion layer is between 2 and 16 angstroms.

4. The apparatus as recited in claim 1, wherein the adhesion layer is a structure in which the adhesion layer is localized to a region of the near field transducer.

5. The apparatus as recited in claim 1, wherein the near field transducer comprises gold.

6. The apparatus as recited in claim 1, wherein the near field transducer has a notch.

7. The apparatus as recited in claim 1, wherein the adhesion layer consists essentially of NiCr and nitrogen.

8. The apparatus as recited in claim 1, wherein a ratio of Ni to Cr in the adhesion layer is in a range of greater than 0% Ni and less than 100% Cr to about 67% Ni and about 33% Cr on an atomic percentage basis.

9. The apparatus as recited in claim 1, wherein the protective layer comprises silicon nitride.

10. A data storage system, comprising:
a magnetic medium;
a drive mechanism for passing the magnetic medium over the near field transducer; and
a controller electrically coupled to a magnetic head comprising the apparatus of claim 1.

11. An apparatus, comprising:
a near field transducer for heating a magnetic medium;
a light source for illuminating the near field transducer;
a write pole adjacent the near field transducer;
an adhesion layer on a media facing side of the near field transducer, the adhesion layer comprising Ni and Cr; and
a protective layer on the media facing side of the adhesion layer,
wherein the protective layer comprises Si, N, and O,
wherein the Cr of the adhesion layer is coupled to the N of the protective layer.

12. The apparatus as recited in claim 11, wherein the adhesion layer consists essentially of NiCr and nitrogen.

13. The apparatus as recited in claim 11, wherein a deposition thickness of the adhesion layer is between 2 and 16 angstroms.

14. The apparatus as recited in claim 11, wherein the adhesion layer is a structure in which the adhesion layer is localized to a region of the near field transducer.

15. The apparatus as recited in claim 11, wherein the near field transducer has a notch.

16. The apparatus as recited in claim 11, wherein at least one component of the adhesion layer is nitrided.

17. The apparatus as recited in claim 11, wherein the Cr in the adhesion layer is at least partially nitrided, wherein a ratio of nitrogen to Cr in the adhesion layer is in a range of 0% Ni and less than 100% Cr to about 67% Ni and about 33% Cr.

18. The apparatus as recited in claim 11, wherein the protective layer comprises silicon nitride.

19. A data storage system, comprising:
a magnetic medium;
a drive mechanism for passing the magnetic medium over the near field transducer; and
a controller electrically coupled to a magnetic head comprising the apparatus of claim 11.

20. A method, comprising:
forming an adhesion layer on a media facing side of the near field transducer, the adhesion layer comprising Ni and Cr; and
forming a protective layer on the media facing side of the adhesion layer,
wherein the protective layer comprises Si, N, and O,
wherein the Cr of the adhesion layer is coupled to the N of the protective layer.

* * * * *